(12) United States Patent
Rao et al.

(10) Patent No.: US 10,362,529 B2
(45) Date of Patent: Jul. 23, 2019

(54) METHOD AND SYSTEM FOR OPTIMIZING CLOSED SUBSCRIBER GROUP (CSG) SELECTION IN WIRELESS COMMUNICATION

(71) Applicant: Samsung Electronics Co., Ltd., Suwon-si, Gyeonggi-do (KR)

(72) Inventors: Prakash Rao, Bangalore (IN); Pavan Kumar Devarayanigari, Bangalore (IN); Dandra Prasad Basavaraj, Bangalore (IN); Srinivas Chinthalapudi, Bangalore (IN); Vijay Ganesh Surisetty, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 14/532,451

(22) Filed: Nov. 4, 2014

(65) Prior Publication Data

US 2015/0126189 A1    May 7, 2015

(30) Foreign Application Priority Data

Nov. 6, 2013 (IN) .............................. 5005/CHE/2013
Oct. 9, 2014 (IN) .............................. 5005/CHE/2013

(51) Int. Cl.
*H04W 48/18* (2009.01)
*H04W 8/18* (2009.01)
(Continued)

(52) U.S. Cl.
CPC ............. *H04W 48/18* (2013.01); *H04W 4/08* (2013.01); *H04W 8/186* (2013.01); *H04W 48/20* (2013.01)

(58) Field of Classification Search
CPC ..... H04W 48/18; H04W 48/20; H04W 8/186; H04W 4/08; H04W 8/183; H04W 48/02; H04W 84/045
See application file for complete search history.

(56) References Cited

U.S. PATENT DOCUMENTS

2010/0110987 A1    5/2010   Subramanian et al.
2010/0113020 A1*   5/2010   Subramanian ........ H04W 48/18
                                                            455/435.2
(Continued)

FOREIGN PATENT DOCUMENTS

GB            2481396 A  * 12/2011  ............ H04W 48/02

OTHER PUBLICATIONS

Merriam-Webster, www.merriam-webster.com, definition of "new".*
(Continued)

*Primary Examiner* — George Eng
*Assistant Examiner* — Hung K Du
(74) *Attorney, Agent, or Firm* — Jefferson IP Law, LLP

(57) ABSTRACT

The various embodiments herein provide a method and system for optimizing Closed Subscriber Group (CSG) selection in wireless communication. The method comprising steps of initiating, by a user equipment (UE), a manual CSG selection, verifying if a manual CSG selection request is new, storing a registered public land mobile network (RPLMN) and a corresponding public land mobile network (PLMN) Selection mode if the CSG selection request is new, changing a PLMN selection mode and the CSG selection mode to MANUAL, registering the UE on to a user selected CSG cell, storing one or more parameters associated with the user selected CSG cell if the registration is successful irrespective of CSG cell belonging to RPLMN or different PLMN and selecting the user selected CSG cell using a
(Continued)

stored PLMN ID and a CSG ID combination in the current PLMN selection mode during power off and power on.

18 Claims, 10 Drawing Sheets

(51) Int. Cl.
*H04W 4/08* (2009.01)
*H04W 48/20* (2009.01)

(56) References Cited

U.S. PATENT DOCUMENTS

| | | | | |
|---|---|---|---|---|
| 2010/0291927 | A1* | 11/2010 | Wu | H04W 48/20 455/435.3 |
| 2011/0212724 | A1* | 9/2011 | Wirtanen | H04W 88/02 455/435.2 |
| 2012/0264425 | A1* | 10/2012 | Krishnamoorthy | H04W 48/16 455/434 |
| 2012/0270552 | A1* | 10/2012 | Shi | H04W 36/0055 455/438 |
| 2013/0148565 | A1* | 6/2013 | Jactat | H04W 8/183 370/312 |

OTHER PUBLICATIONS

3rd Generation Partnership Project; Technical Specification Group Core Network and Terminals; Non-Access-Stratum (NAS) function related to Mobile Station (MS) in idle mode, 3GPP TS 23.122, Dec. 2013, pp. 1-45, v12.3.0.

* cited by examiner

US 10,362,529 B2

METHOD AND SYSTEM FOR OPTIMIZING CLOSED SUBSCRIBER GROUP (CSG) SELECTION IN WIRELESS COMMUNICATION

PRIORITY

This application claims priority under 35 U.S.C. § 119(a) to Indian Provisional Patent Application Serial No. 5005/CHE/2013, which was filed in the Indian Intellectual Property Office on Nov. 6, 2013, and Indian Complete Patent Application Serial No. 5005/CHE/2013, which was filed in the Indian Intellectual Property Office on Oct. 9, 2014, the entire contents of which are incorporated herein by reference.

BACKGROUND OF THE INVENTION

1. Field of the Invention

The embodiments herein generally relate to wireless communication, and particularly relates to a method of optimizing Closed Subscriber Group (CSG) selection in wireless communication.

2. Description of the Related Art

A Closed Subscriber Group identifies subscribers of an operator who are permitted to access one or more cells of the PLMN but which have restricted access. In automatic mode of CSG selection, the access stratum utilizes the White List in a UE (combination of Operator CSG list and Allowed CSG list) to re-select/handover to a CSG cell. In Manual mode, the available CSGs are scanned and displayed to user based on configuration by HPLMN on the UICC. Upon manually selecting a CSG cell, the UE behavior is differentiated based on whether the selected CSG belongs to the registered PLMN or not. If the PLMN of the selected CSG is different than the currently registered PLMN, then the MS performs the following:

MS saves the "current PLMN selection mode" and RPLMN into a non-volatile memory

MS moves to a MANUAL PLMN selection mode.

Upon successful registration on the registered CSG cell, RPLMN is not updated with that of the selected PLMN.

If the registration fails or upon loss of coverage on the user selected CSG, MS should change the PLMN selection mode to one saved prior to MANUAL CSG selection and attempt recovery with the RPLMN.

The following case scenarios describes the ambiguities in the current specification Case 1: Not storing the selected CSG as RPLMN upon successful manual CSG selection as specified in section 5.5.4 of 22.220, can lead to UE context mismatch between the MS and MME or SGSN during recovery of normal service using the stored RPLMN as shown in FIG. 1. Specification clearly mentions that the current PLMN shall not be stored as RPLMN so the EF's_EF_EPSLOCI, EF_PSLOCI, EF_LOCI shall not be updated on to the UICC by the MS. However, there is no mention about other values which are updated on UICC like EF_EPSNSC, EF_Keys, EF_KeysPS etc. When UE attempts recovery due to registration failure or MS is no longer in the coverage of the CSG, the MS shall use wrong parameters with the target MME/SGSN during registration e.g. GUTI, Old Lai, Last registered TAI etc, also will not match at the target MME since network would have deleted the related registration info during successful registration of the CSG.

Case 2: The current specification doesn't consider subsequent manual user re-selection of CSG cells. It is specified that a MS should change the PLMN selection mode to MANUAL if the selected CSG ID does not belong to the current RPLMN. Also the RPLMN should not be updated during a successful manual CSG selection. During a subsequent MANUAL CSG selection, the following points such as what value the MS should consider as RPLMN for the PLMN comparison, the actual RPLMN or the currently selected PLMN of the CSG are ambiguous. In case the selected CSG ID is different from both RPLMN and the currently selected CSG cell, saving of the current PLMN selection mode as per clause i) of section 4.4.3.1.3.3 of 23.122, which is MANUAL due to the previous manual CSG selection, will overwrite the previously saved PLMN selection mode during the first manual CSG Selection as shown in FIG. 2. This may cause UE to go in to an unintended PLMN selection mode while attempting recovery as per clause iv) of 4.4.3.1.3.3 of 23.122.

Case 3: The current specification doesn't consider a UE undergoing a power cycle when camped on a manually selected CSG cell as shown in FIG. 3. If the PLMN selection mode is changed to MANUAL from AUTOMATIC due to manual CSG selection as per clause II), 4.4.3.1.3.3 of 23.122 and UE is powered off/restarted in this state, MS shall try for normal service in MANUAL PLMN selection mode with the Registered PLMN. In case the MS has deleted the RPLMN or has no valid RPLMN, MS may stay in limited service mode until user manually selects a PLMN or changes the mode to AUTOMATIC.

Case 4: Assuming there are multiple white listed CSG cells in the vicinity of the MS and user selects the less suitable CSG cell manually, the current method adopted by the specification requires a manual CSG selection every time the MS is restarted even though the MS stays in the same CSG area. Upon restart, MS shall directly camp on to the more suitable CSG cell automatically thus requiring the user to reselect the required CSG cell manually as shown in FIG. 4. This kind of scenario is easily possible in a region with overlapping CSG cells where the MS is subscribed to both CSGIDs.

In view of the foregoing, it is realized that the current method for Manual CSG selection in a PLMN different than the current registered PLMN is ambiguous, which can cause the MS to go into an undesired PLMN state. Further the existing method is not optimal causing extra NAS signaling on the UE and the network during power on. Hence there is a need for a method and system for addressing the existing loop holes and to optimize the manual CSG selection.

The foregoing examples of the related art and limitations related therewith are intended to be illustrative and not exclusive. Other limitations of the related art will become apparent upon a reading of the specification and a study of the drawings.

SUMMARY OF THE INVENTION

The various embodiments herein provide a method for optimizing Closed Subscriber Group (CSG) selection in wireless communication. The method comprising steps of initiating, by a user equipment (UE), a manual CSG selection, verifying if a manual CSG selection request is new, storing a registered public land mobile network (RPLMN) and a corresponding public land mobile network (PLMN) Selection mode if the CSG selection request is new, changing a PLMN selection mode and the CSG selection mode to MANUAL, registering the UE on to a user selected CSG cell, storing one or more parameters associated with the user selected CSG cell if the registration is successful irrespective of CSG cell belonging to RPLMN or different PLMN and selecting the user selected CSG cell using a stored PLMN ID and a CSG ID combination in the current PLMN selection mode during power off and power on.

According to an embodiment of the present invention, the method further comprises of initiating a recovery using the stored RPLMN and PLMN selection mode if the UE's registration with the user selected CSG cell is not successful.

According to an embodiment of the present invention, the one or more parameters associated with the user selected CSG cell comprises of a PLMN ID and CSG-ID combination of the selected CSG cell and a CSG selection mode of the UE.

According to an embodiment of the present invention, the method further comprises of checking if the CSG selection mode is manual and retaining the stored RPLMN and the corresponding PLMN Selection mode when user initiates a subsequent manual CSG selection.

According to an embodiment of the present invention, registering and camping the UE on to the user selected CSG comprises of storing parameters associated with a current camped CSG, wherein the CSG parameters comprises of current registered CSG information and current CSG selection mode of the UE and updating RPLMN on to the UE.

According to an embodiment of the present invention, the CSG selection is performed during power on for at least one of identifying a previously camped CSG cell, attempting registration if the CSG cell is found and continuing with the PLMN and the CSG Selection mode before power off, if the registration is successful.

According to an embodiment of the present invention, the PLMN selection is performed during at least one of if the registration with the previously camped CSG is not successful, if the CSG cell is not found, or if the coverage lost from the selected CSG.

According to an embodiment of the present invention, performing the PLMN selection comprises of resetting at least one of stored RPLMN, PLMN selection mode, information on the last registered CSG and current CSG selection mode of the UE.

According to an embodiment of the present invention, the method further comprises of checking, by the UE, if a same Universal Integrated Circuit Card (UICC) is used during the power-off and power-on condition and performing PLMN selection if the same UICC is used.

Embodiments herein further provide a system for optimizing Closed Subscriber Group (CSG) selection in wireless communication. The system comprising a user equipment (UE) adapted for initiating a manual CSG selection, and at least one network element adapted for verifying if a manual CSG selection request is new, storing a registered public land mobile network (RPLMN) and a corresponding public land mobile network (PLMN) Selection mode if the CSG selection request is new, changing a PLMN selection mode and the CSG selection mode to MANUAL, registering the UE on to a user selected CSG cell, storing one or more parameters associated with the user selected CSG cell if the registration is successful irrespective of CSG cell belonging to RPLMN or different PLMN and selecting the user selected CSG cell using a stored PLMN ID and a CSG ID combination in the current PLMN selection mode during power off and power on.

According to an embodiment of the present invention, the network element is further adapted for initiating a recovery using the stored RPLMN and PLMN selection mode if the UE's registration with the user selected CSG cell is not successful.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

The other objects, features and advantages will occur to those skilled in the art from the following description of the preferred embodiment and the accompanying drawings in which.

Although specific features of the present invention are shown in some drawings and not in others, this is done for convenience only as each feature may be combined with any or all of the other features in accordance with the present invention.

DETAILED DESCRIPTION OF EMBODIMENTS OF THE PRESENT INVENTION

The present invention provides a method and apparatus for discovering multiple support devices in a wireless environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The present invention provides a method and system for optimizing Closed Subscriber Group (CSG) selection in wireless communication. In an embodiment, the present invention provides a mechanism for saving of Public Land Mobile Network (PLMN) selection mode only during the first manual selection and hence ensuring that the User Equipment (UE) returns to correct PLMN selection mode and Registered Public Land Mobile Network (RPLMN) during rollback. Further, the present invention enables the UE to update RPLMN with selected CSG's PLMN after successful CSG selection. Hence, all parameters in UE are in synchronous with the network. Further, the UE informs correct old Local Area Identity (LAI/TAI/GUTTI) to the network and thus assisting the Mobile Management Entity (MME) to contact correct MME to retrieve UE's context. This in turn reduces unnecessary signaling. Further, the present invention enhances the behavior of UE to save the last registered CSG information into a non-volatile memory by making the UE find the last registered CSG cell even after the UE is powered on. This enhances the user experience as UE directly finds the user selected CSG cell. In case the last registered CSG cell is not found, UE rolls back to the saved RPLMN and saved PLMN selection mode thus ensuring that the UE rolls back to the correct state prior to manual CSG selection. Furthermore, the present invention allows the user preference to be saved during the power on/off of the UE. Hence, during power on, the UE directly attempts to find CSG cell which is user selected. Thus, the UE camps on to the user selected CSG directly.

Figure 1:
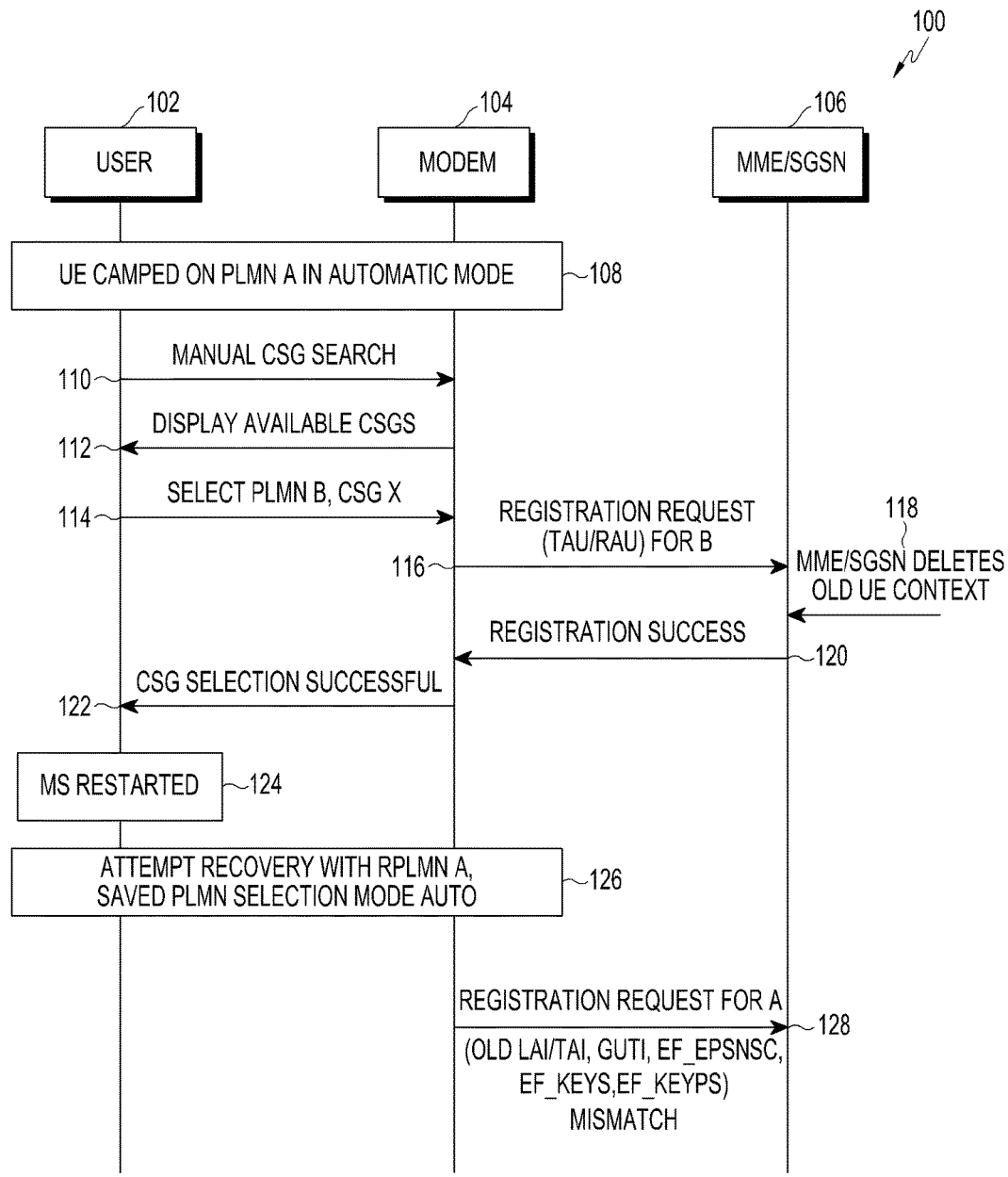
FIG. 1 is a flow diagram illustrating an exemplary process of NAS registration when UE is camped on manually selected CSG cell, according to a prior art illustration.
Figure 2:
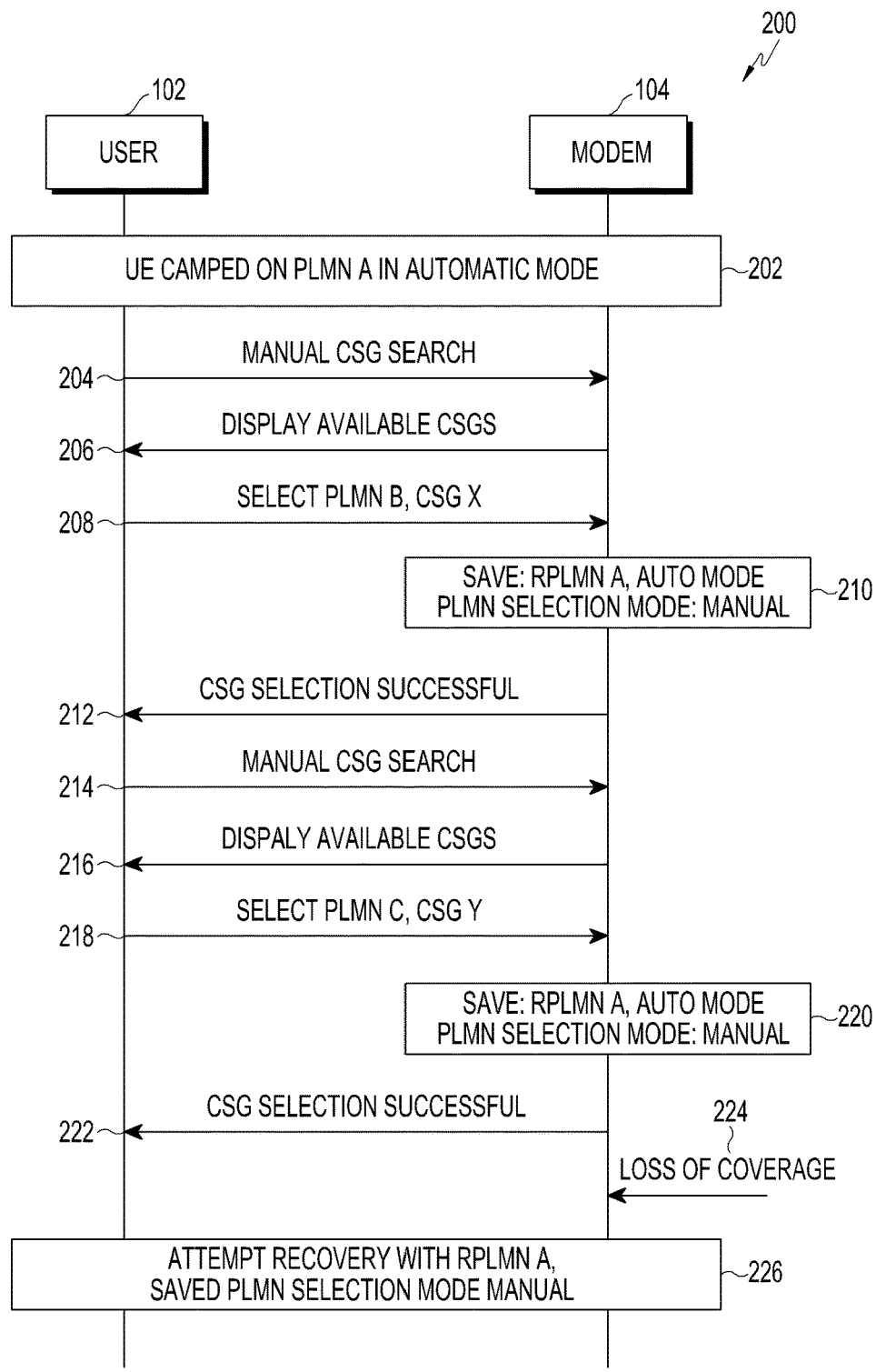
FIG. 2 is a flow diagram illustrating an exemplary process of subsequent manual CSG selection when modem attempts recovery with PLMN selection mode as MANUAL instead of AUTOMATIC, according to a prior art illustration.
Figure 3:
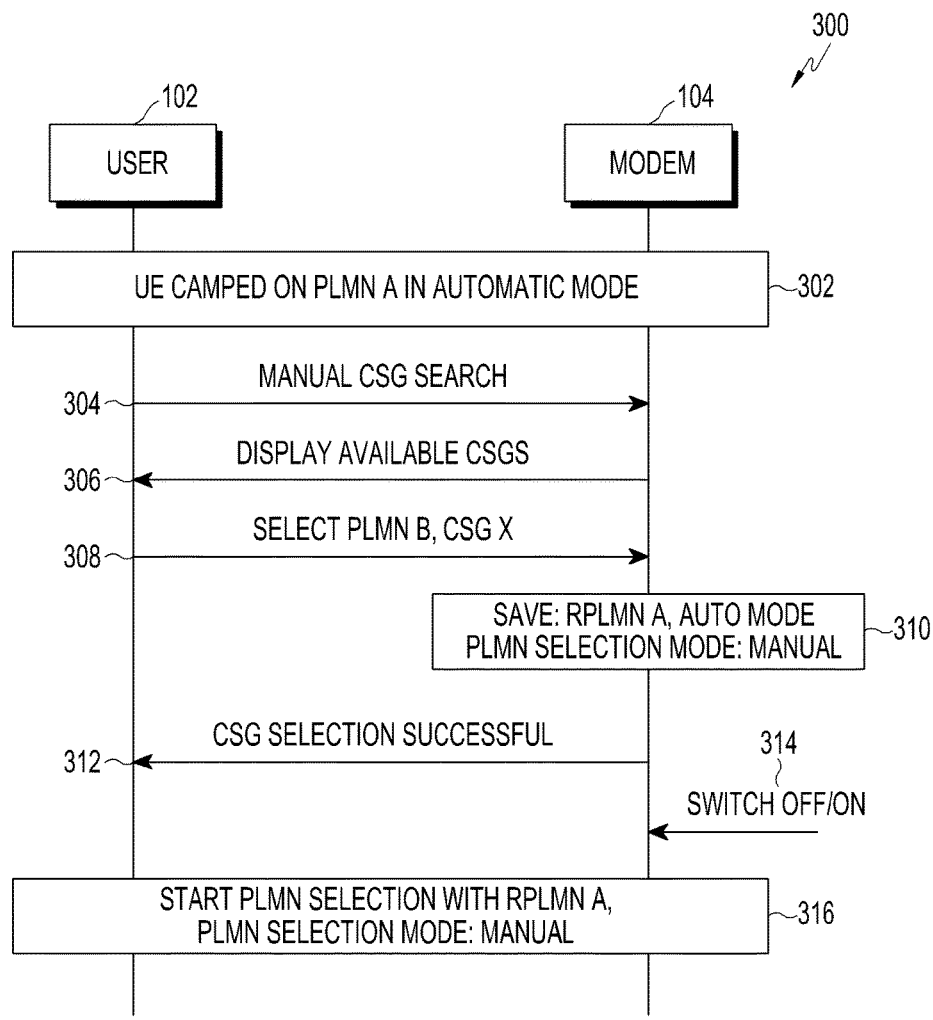
FIG. 3 is a flow diagram illustrating an exemplary process of PLMN selection when UE powers on after manual CSG selection, according to a prior art illustration.
Figure 4:
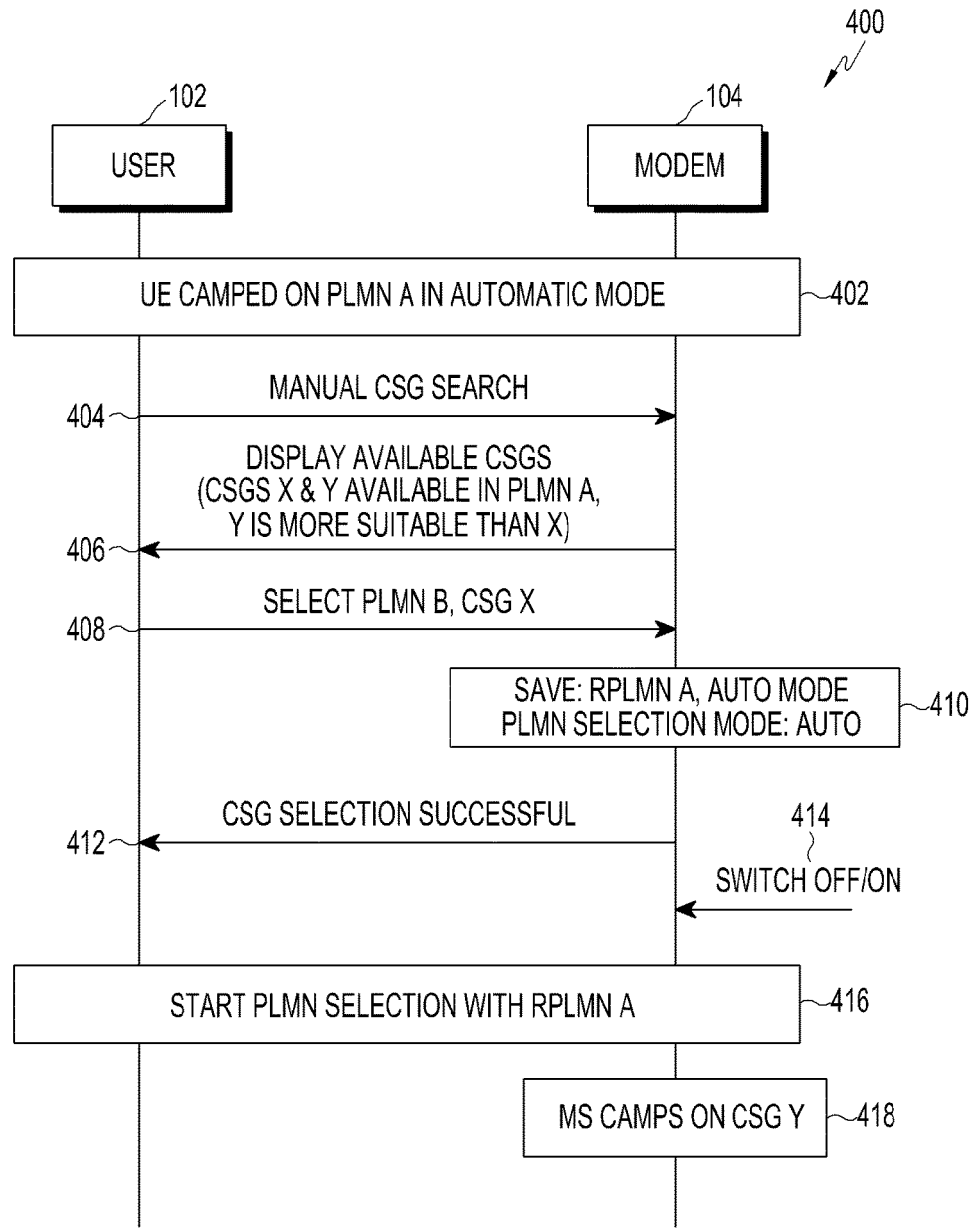
FIG. 4 is a flow diagram illustrating an exemplary process of UE camping on one or more suitable CSG cells during a restart, according to a prior art prior art illustration.
Figure 5:
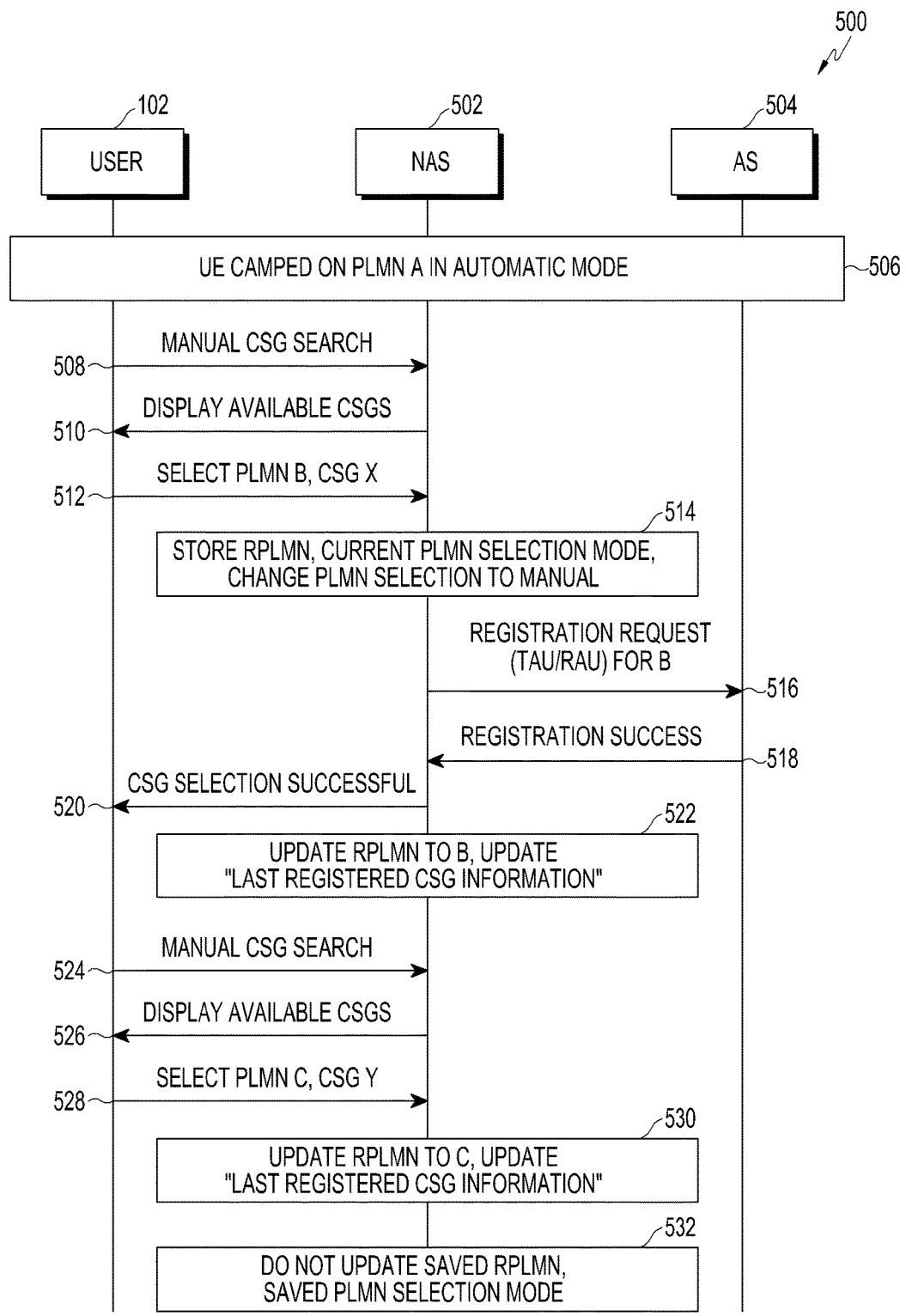
FIG. 5 is a flow diagram illustrating an exemplary process of CSG selection in manual CSG selection mode, according to an embodiment of the present invention.

Generally, any given geographical location is served by overlapping public land mobile networks (PLMNs) that provide mobile cellular services. For example, different PLMNs are deployed by various wireless network operators throughout the same city. Under certain circumstances, a given access terminal (e.g., a cell phone) may be allowed to access these different PLMNs. Accordingly, such an access terminal may be configured to select which PLMN is to be used at a given point in time. In some cases, an access terminal may employ an automatic mode of PLMN selection. Here, the access terminal may continually monitor for available PLMNs and automatically switch to a new PLMN based on specified selection criteria. In a typical case, the selection criteria comprise a prioritized list of PLMNs that indicates the order in which the access terminal is to select a PLMN in an event where multiple PLMNs are available. Other types of selection criteria may be used as well. For example, priority may be given to a PLMN that would currently provide the best quality of service for the access terminal. In some cases, an access terminal may employ a manual mode of PLMN selection. For example, a list of currently available PLMNs may be displayed on a screen of the access terminal. The user may then select one of the PLMNs and the access terminal switches to that PLMN. In contrast with an automatic PLMN selection mode, in this case the access terminal will stay on this PLMN even if other higher priority PLMNs are available. For example, the access terminal may stay on the selected PLMN until a different PLMN is manually selected or until the selected PLMN no longer provides service to the access terminal FIG. 5 is a flow diagram illustrating an exemplary process of CSG selection in manual CSG selection mode, according to an embodiment of the present invention. At step 506, UE is camped on a PLMN A in automatic mode. At step 508, UE requests CSG manual selection which triggers the Non Access Stratum (NAS) to request a list of available CSG cells across all PLMNs. Further, when the UE requests for manual search, the NAS verifies if the manual CSG selection request is new. Here, manual selection may apply to CSG cells both in and out of the UE's allowed CSG list (e.g., whitelist) and any operator CSG list. The Access Stratum (AS) scans all radio frequency (RF) channels according to its capabilities and returns a list of available CSG cells for a user to select from across any PLMNs. For example, the access terminal may scan the UMTS Terrestrial Radio Access (UTRA) and/or Evolved Universal Terrestrial Radio Access (E-UTRA) bands according to its capabilities to find available CSG identifiers (IDs). On each carrier, the AS may search (at least) for the strongest cell, read its system information and report available CSG ID(s) belonging to the registered PLMN together with their Home NodeB (HNB) name, if available, to the NAS for a user to select from. The search for available CSG IDs may be stopped on request of the NAS. At step 510, the NAS displays to the user all the CSGs that are available and the associated PLMNs. The NAS may also display other information such as the signal strength of the CSG cell and whether the CSG cell belongs to the current PLMN. For example, the NAS may use signal strength bars to indicate that it has detected the presence of the CSG cell. However, the NAS may decide to not select that cell due to unsuitable RF conditions. The NAS will generally not display a PLMN for which there is no CSG cell available for selection. At step 512, the user at the UE selects one CSG cell among the list of CSG cells and reports the CSG ID and the PLMN corresponding to the selected CSG cell to the NAS. At step 514, the NAS stores the RPLMN, current PLMN selection mode into non-volatile memory irrespective of whether the selected CSG ID belongs to the same PLMN as that of RLMN or not and changes the PLMN selection mode and CSG selection mode to MANUAL. At step 516, the NAS performs registration procedures by sending a registration request (TAU/RAU) for selected PLMN with the AS. The process of registration is performed if the NAS determines to be required as per 24.301 NAS procedure requirements. Upon successful registration, at step 518, the AS sends a registration success message to the NAS including details of the CSG cell such as the CSG ID, tracking area code, location area code, and routing area code. At step 520, the NAS forwards the registration success message to the user indicating that the UE is successfully registered with the selected CSG. Subsequently, at step 522, the values of the currently selected CSG cell i.e. PLMN ID and the selected CSG ID are updated into "lastregisteredCSGInformation" and CSG selection mode respectively in the non-volatile memory. Hence, when the registration of the UE with the selected CSG cell fails, the UE attempts recovery with the saved RPLMN and PLMN selection mode. Once the UE is registered and camped successfully on a CSG cell due to manual CSG selection, UE has valid values of saved RPLMN, saved PLMN selection mode, CSG selection mode as MANUAL and valid values of currently registered CSG parameters (PLMN ID and CSG ID). Upon a subsequent user CSG reselection by performing the steps 524-528, the newly selected CSG cell and the corresponding PLMN during the subsequent CSG reselection are updated in the non-volatile memory over-writing the saved CSG parameters corresponding to previous CSG selection at step 530. However, the saved RPLMN and saved PLMN selection mode during the first manual CSG selection are not updated at step 532.

Figure 6:
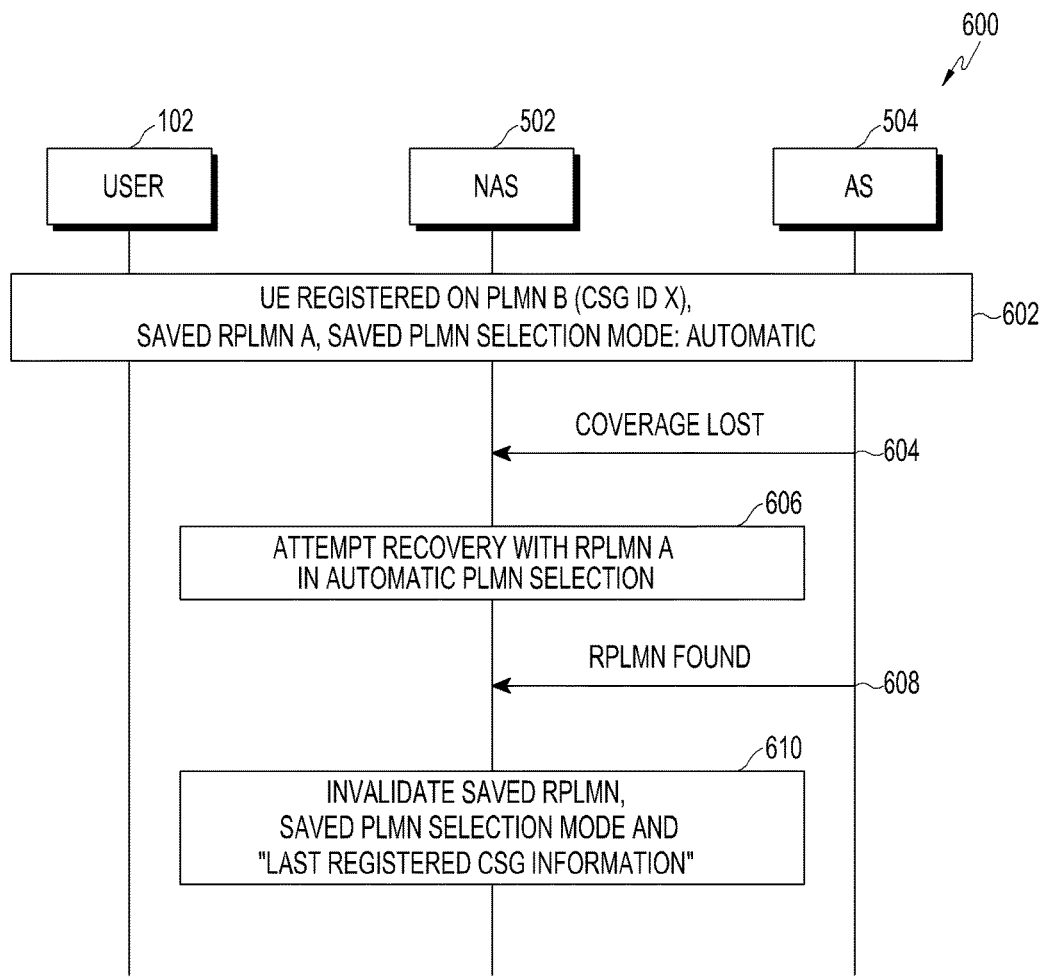
FIG. 6 is a flow diagram illustrating an exemplary process of CSG selection in manual CSG selection mode when UE loses coverage of the selected CSG cell, according to an embodiment of the present invention.

FIG. 6 is a flow diagram illustrating an exemplary process of CSG selection in manual CSG selection mode when UE loses coverage of the selected CSG cell, according to an embodiment of the present invention. At step 602, UE is registered onto a PLMN, say PLMN B, with saved RPLMN and saved PLMN selection mode as AUTOMATIC. Consider that the AS of an access terminal loses coverage of the CSG or other RF conditions cause the access terminal to move out of coverage of cell(s) belonging to the selected CSG. In such a scenario, at step 604, the AS informs the NAS that a CSG cell with the same CSG ID is no longer available for reselection. At step 606, the NAS attempts recovery for normal service using saved RPLMN and saved PLMN selection mode upon receiving the coverage lost message from the AS. At step 608, the AS informs the NAS that the RPLMN was found during the process of recovery. At step 610, the saved RPLMN, saved PLMN selection mode and "lastregisteredCsgInformation" are invalidated by the NAS upon receiving the RPLMN found message.

Figure 7:
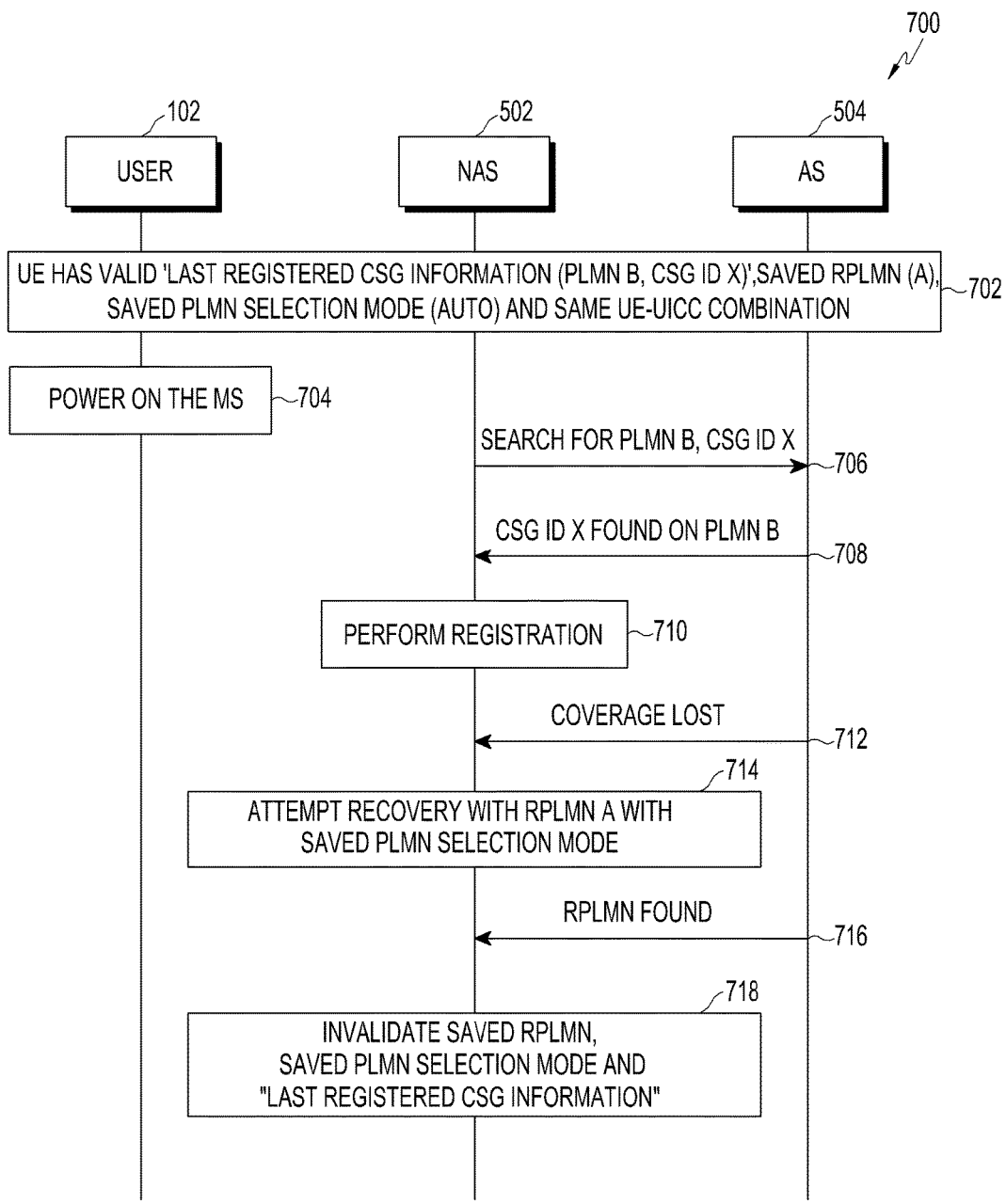
FIG. 7 is a flow diagram depicting UE's behavior during power on with CSG selection mode set to MANUAL, according to an embodiment of the present invention.

FIG. 7 is a flow diagram depicting UE's behavior during power on with CSG selection mode already set to MANUAL and same UE-UICC combinations are used, according to an embodiment of the present invention. At step 702, the UE has valid 'lastregisteredCsgInformation (PLMN B, CSG ID X)', saved RPLMN (A) and saved PLMN SELECTION MODE (AUTO). At step 704, the UE is powered on. For an UE that powers on with CSG selection mode in the non-volatile memory already set to MANUAL due to UE's actions before switching off, at step 706, the UE gives priority to the user selected CSG cell and searches for the stored CSG cell as read from the "lastregisteredCsgInformation". For example, the user selected CSG cell is CSG ID on PLMN B. When the UE detects the user selected CSG cell, i.e. CSG cell with CSG ID X on PLMN B. At step 708, the AS sends a confirmation message indicating that the CSG cell with CSG ID and the corresponding PLMN is found to the NAS. Then, at step 710, NAS performs registration with the found CSG cell. During the registration, if AS finds that the coverage is lost for the CSG cell, then at step 712, AS notifies the same to the NAS through a notification message. At step 714, NAS performs recovery with RPLMN A in automatic PLMN selection mode. At step 716, when the UE recovers the normal service, AS sends an RPLMN found message to the NAS indicating that the recovery of the network was successful. At step 718, the saved RPLMN, saved PLMN selection mode and 'lastregisteredCsgInformation' are invalidated upon successful recovery of the CSG cell.

Figure 8:
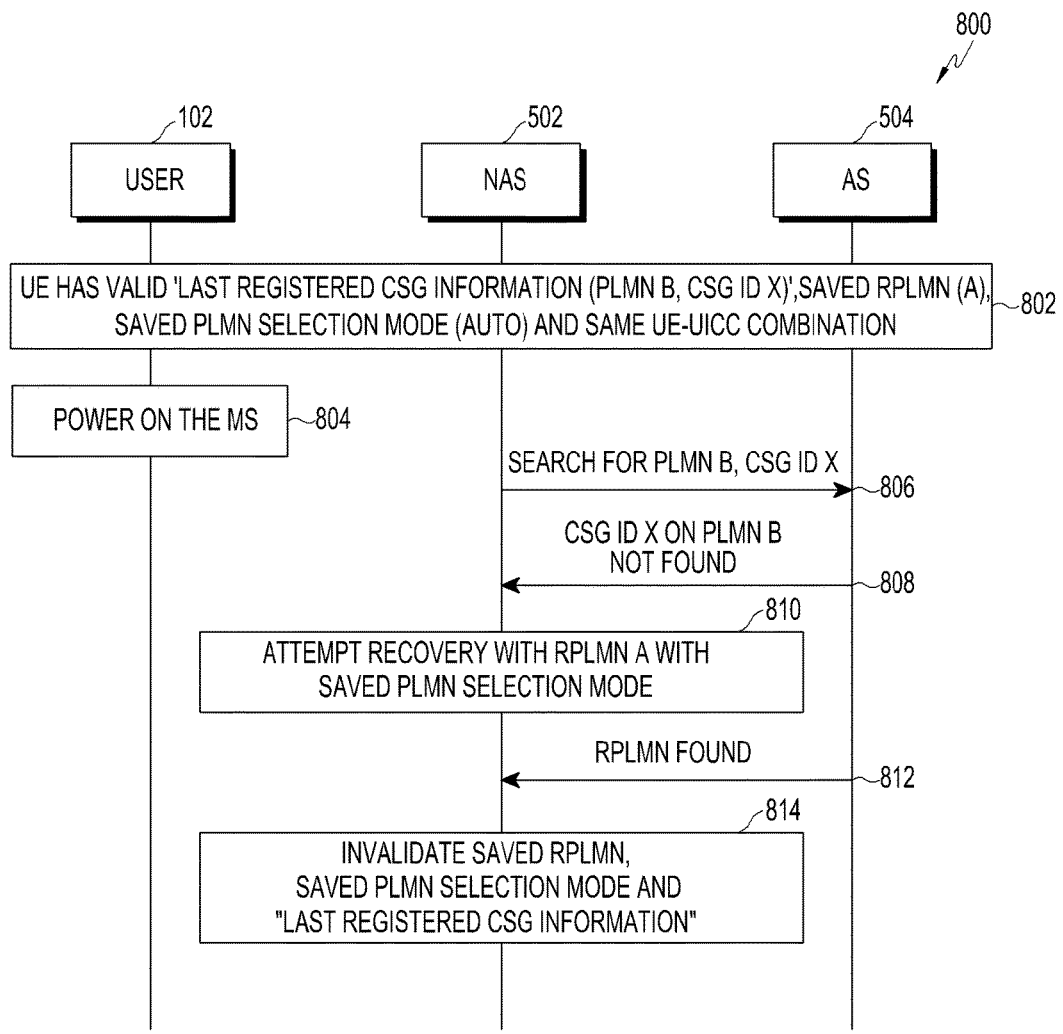
FIG. 8 is a flow diagram depicting UE's behavior in power on mode with CSG selection mode set to MANUAL, according to another embodiment of the present invention.

FIG. 8 is a flow diagram depicting UE's behavior in power on with CSG selection mode set to MANUAL and same UE-UICC combinations are used, according to another embodiment of the present invention. At step 802, the UE has valid 'lastregisteredCsgInformation (PLMN B, CSG ID X)', saved RPLMN (A) and saved PLMN SELECTION MODE (AUTO). At step 804, the UE is powered on. At step 806, the UE gives priority to the user selected CSG cell and searches for the stored CSG cell as read from the "lastregisteredCsgInformation". For example, the user selected CSG cell is CSG ID X on PLMN B. When the AS does not detect the user selected CSG cell, i.e. CSG cell with CSG ID X on PLMN B, then at step 808, the AS sends a message indicating that the preferred CSG cell with CSG ID and the corresponding PLMN was not found to the NAS. At step 810, the NAS attempts recovery for normal services with RPLMN A in automatic PLMN selection mode upon receiving the message from the AS. If the RPLMN is found during the recovery, then at step 812, the AS sends a message indicating that the RPLMN was found to the NAS. At step 814, the saved RPLMN, saved PLMN selection mode and 'lastregisteredCsgInformation' are invalidated upon successful recovery of the CSG cell.

Figure 9:
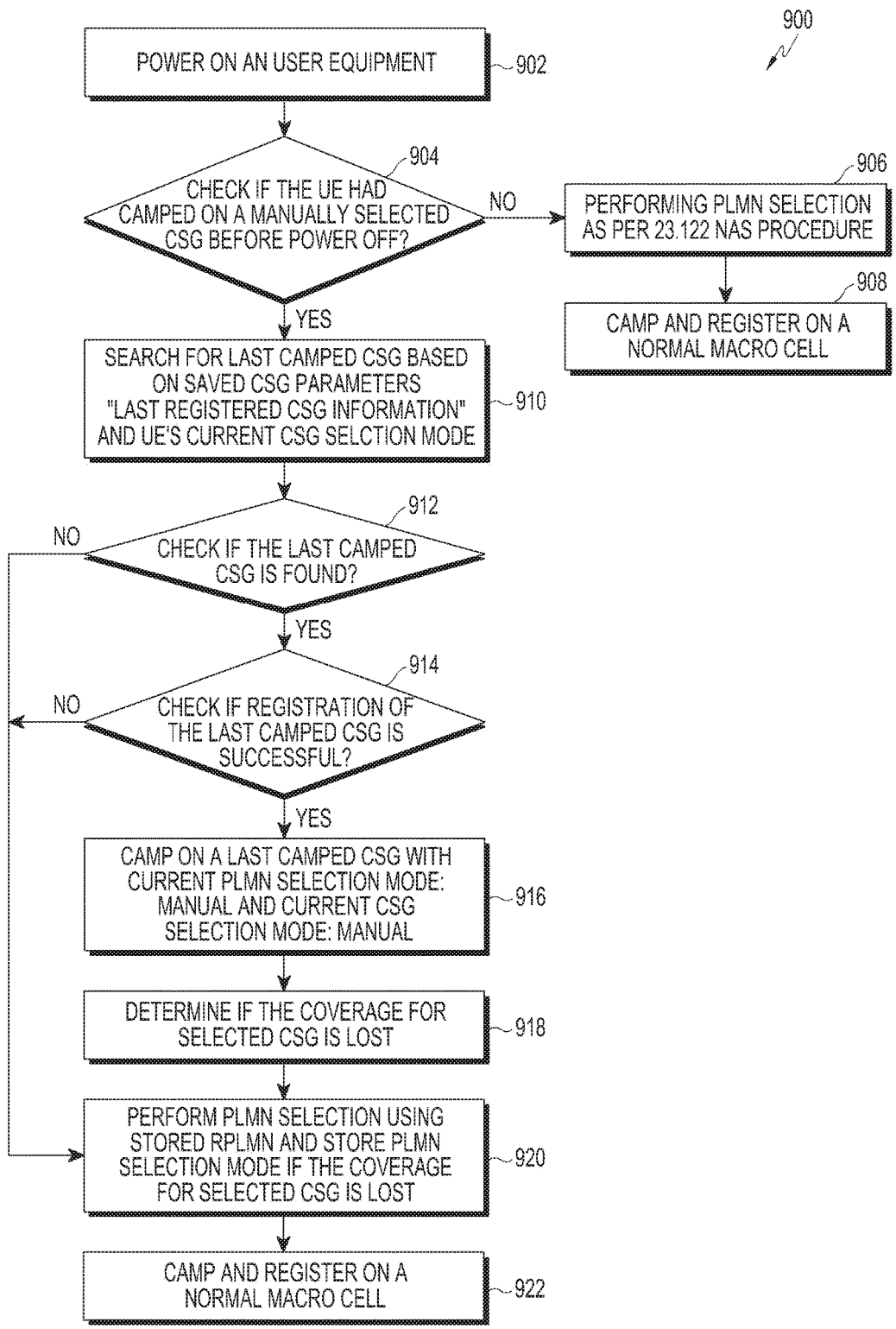
FIG. 9 is a flowchart illustrating an exemplary method of power-on of the UE for CSG cell selection, according to an embodiment of the present invention.

FIG. 9 is a flowchart illustrating an exemplary method of power-on of the UE for CSG cell selection, according to an embodiment of the present invention. At step 902, the UE is powered on. At step 904, it is checked if the UE had camped on a manually selected CSG before power off. If the UE had not camped on a manually selected CSG before power off, then at step 906, PLMN selection as per 23.122 NAS procedure is performed and then at step 908, the UE is camped and registered on a normal macro cell. If the UE had camped on a manually selected CSG before power off, then at step 910, last camped CSG is searched based on saved CSG parameters "lastregisteredCsgInformation" and UE's current CSG selection mode. At step 912, it is checked if the last camped CSG is found. If the last camped CSG is not found, then steps 920-922 are carried out. If the last camped CSG is found, then at step 914, it is determined whether the registration of the UE with the last camped CSG cell is successful. If the registration is not successful then steps 920-922 are performed. If the registration is successful, then at step 916, UE is camped on the last camped CSG cell with current PLMN selection mode as Manual and current CSG selection mode as MANUAL. At step 918, it is determined if the coverage for camped CSG cell is lost. If the coverage for camped CSG cell is determined to be lost then at step 920, PLMN selection is performed by referring to stored RPLMN and stored PLMN selection mode. Also, the PLMN selection is performed by resetting at least one of stored RPLMN, PLMN selection mode, information on the last-egisteredCsgInformation and current CSG selection mode of the UE. The RPLMN and the PLMN selection mode are stored in the non-volatile memory. At step 922, UE is camped and registered on a normal macro cell.

Figure 10:
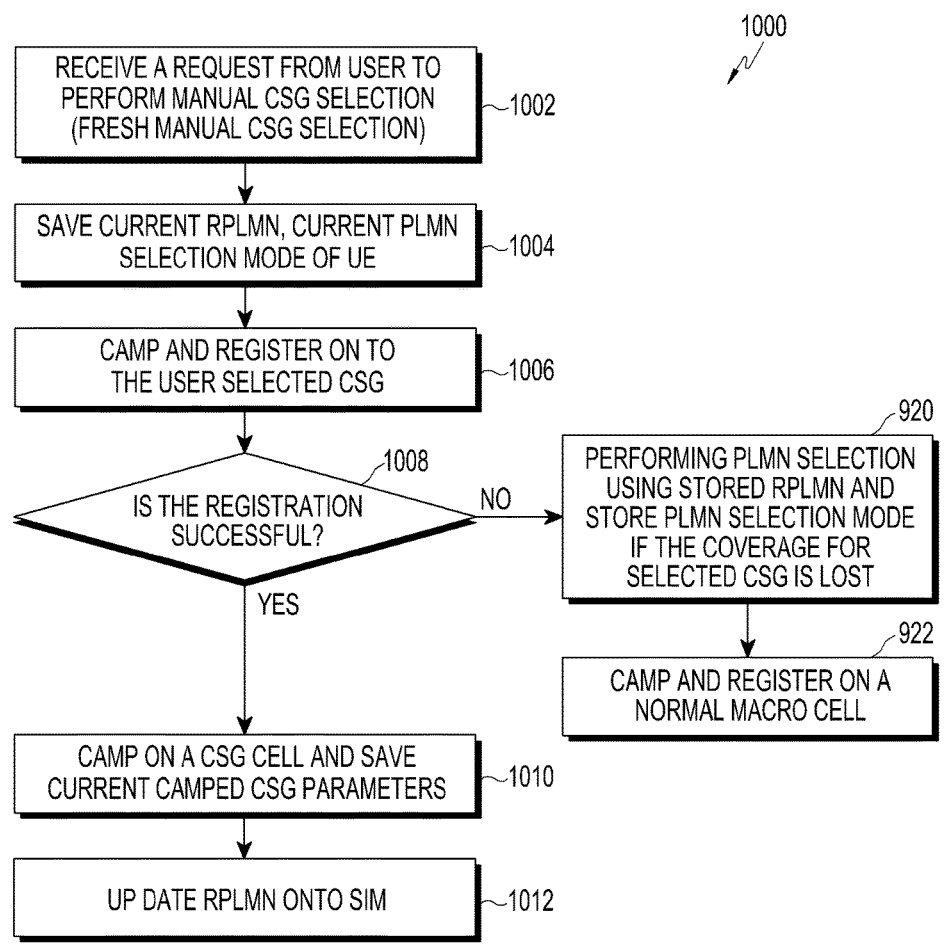
FIG. 10 is a flowchart illustrating an exemplary method of manual CSG cell selection, according to an embodiment of the present invention.

FIG. 10 is a flowchart illustrating an exemplary method of manual CSG cell selection, according to an embodiment of the present invention. At step 1002, a request is received from a user to perform manual CSG selection. This could be a fresh manual CSG selection. At step 1004, the current RPLMN, the current PLMN selection mode of the UE are saved. At step 1006, the UE is camped and registered onto the user selected CSG. At step 1008, it is determined whether the registration of the UE with the camped CSG cell is successful. If the registration is not successful, then at step 920, PLMN selection is performed using stored RPLMN and stored PLMN selection mode. The RPLMN and the PLMN selection mode are stored in the non-volatile memory. Further, the PLMN selection is performed using the 'lastregisteredCsgInformation' and UE's current CSG selection mode. At step 922, UE is camped and registered on a normal macro cell. If the registration is successful, then at step 1010, the UE is camped on a CSG cell and current camped CSG parameters are saved. At step 1012, the RPLMN is updated onto the SIM card of the UE.

The embodiments herein optimizes the MS behavior during manual CSG selection by saving information to perform rollback, updating RPLMN to reduce NAS signaling and enhancing the user behavior by searching for the last registered CSG information during power on.

The present embodiments have been described with reference to specific example embodiments. It will be evident that various modifications and changes may be made to these embodiments without departing from the broader spirit and scope of the various embodiments. Furthermore, the various devices, modules, and the like described herein may be enabled and operated using hardware circuitry, firmware, and/or software embodied in a machine readable medium. Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A method of optimizing closed subscriber group (CSG) selection in wireless communication, the method comprising steps of:
   verifying if a request of a manual CSG selection initiated by a user equipment (UE) is a manual CSG reselection that follows a previous manual CSG selection;
   storing a registered public land mobile network (RPLMN) and a corresponding public land mobile network (PLMN) selection mode that were in use before the request of the manual CSG selection is initiated when the request of the manual CSG selection is not the manual CSG reselection that follows the previous manual CSG selection irrespective of whether a user selects a CSG cell that belongs to the same PLMN as the RPLMN;
   skipping storing the RPLMN and the corresponding PLMN selection mode that were in use before the request of the manual CSG selection is initiated when the request of the manual CSG selection is the manual CSG reselection that follows the previous manual CSG selection;
   entering into a manual CSG selection mode; and
   registering the UE on to the user selected CSG cell selected in the manual CSG selection mode.

2. The method of claim 1, further comprising:
   storing one or more parameters associated with the user selected CSG cell if the registration is successful irrespective of CSG cell belonging to RPLMN or different PLMN; and
   selecting the user selected CSG cell using a stored PLMN ID and a CSG ID combination in the current PLMN selection mode during power off and power on.

3. The method of claim 2, further comprising:
   initiating a recovery using the stored RPLMN and PLMN selection mode if the UE's registration with the user selected CSG cell is not successful.

4. The method of claim 2, wherein the one or more parameters associated with the user selected CSG cell comprises:
   a PLMN ID and CSG-ID combination of the selected CSG cell; and
   a CSG selection mode of the UE.

5. The method of claim 1, further comprising:
   if the request of the manual CSG selection is the manual CSG reselection initiated following the previous manual CSG selection, retaining a previous RPLMN and a corresponding previous PLMN selection mode that were stored before the previous manual CSG selection.

6. The method of claim 2, wherein the request of the CSG selection is performed during power on for at least one of:
   identifying a previously camped CSG cell;
   attempting registration if the CSG cell is found; and
   continuing with the PLMN and the CSG selection mode before power off, if the registration is successful.

7. The method of claim 2, wherein a PLMN selection is performed during at least one of:
   if the registration with the previously camped CSG is not successful;
   if the CSG cell is not found; or
   if the coverage lost from the selected CSG.

8. The method of claim 7, wherein the performing of the PLMN selection further comprises:
   resetting at least one of stored RPLMN, PLMN selection mode, information on the last registered CSG and current CSG selection mode of the UE.

9. The method of claim 7, wherein the registering and camping of the UE on to the user selected CSG comprises:
   storing parameters associated with a current camped CSG, wherein the CSG parameters comprises of current registered CSG information and current CSG selection mode of the UE; and
   updating RPLMN on to the UE.

10. The method of claim 2, further comprising:
    determining, by the UE, if a same Universal Integrated Circuit Card (UICC) is used during the power-off and power-on condition;
    performing PLMN selection if different UICC is used; and
    continuing in manual CSG selection mode along with corresponding stored parameters of CSG information if same UICC is used.

11. A system for optimizing closed subscriber group (CSG) selection in wireless communication, the system comprising:
    at least one network element configured to:
    verify if a request of the manual CSG selection initiated by a user equipment (UE) is a manual CSG reselection that follows a previous manual CSG selection,
    store a registered public land mobile network (RPLMN) and a corresponding public land mobile network (PLMN) selection mode that were in use before the request of the manual CSG selection is initiated when the request of the CSG selection is not the manual CSG reselection that follows the previous manual CSG selection irrespective of whether a user selects a CSG cell that belongs to the same PLMN as the RPLMN,
    skip storing the RPLMN and the corresponding PLMN selection mode that were in use before the request of the manual CSG selection is initiated when the request of the manual CSG selection is the manual CSG reselection that follows the previous manual CSG selection,
    enter into a manual CSG selection mode, and
    register the UE on to the user selected CSG cell selected in the manual CSG selection mode.

12. The system of claim 11, wherein the at least one network element is further configured to:
    store one or more parameters associated with the user selected CSG cell if the registration is successful irrespective of CSG cell belonging to RPLMN or different PLMN, and
    select the user selected CSG cell using a stored PLMN ID and a CSG ID combination in the current PLMN selection mode during power off and power on.

13. The system of claim 12, wherein the network element is further configured to:

initiate a recovery using the stored RPLMN and PLMN selection mode if the UE's registration with the user selected CSG cell is not successful.

14. The system of claim 12, wherein the one or more parameters associated with the user selected CSG cell comprises:
    a PLMN ID and CSG-ID combination of the selected CSG cell; and
    a CSG selection mode of the UE.

15. The system of claim 11, wherein the at least one network element is further configured to:
    if the request of the manual CSG selection is the manual CSG reselection initiated following the previous manual CSG selection, retain a previous RPLMN and a corresponding previous PLMN selection mode that were stored before the previous manual CSG selection.

16. The system of claim 12, wherein the CSG selection is performed during power on during at least one of:
    identifying a previously camped CSG cell;
    attempting registration if the CSG cell is found; and
    continuing with the PLMN and the CSG selection mode before power off, if the registration is successful.

17. The system of claim 12, wherein a PLMN selection is performed based on at least one of:
    if the registration with the previously camped CSG is not successful;
    if the CSG cell is not found; or
    if the coverage lost from the selected CSG.

18. The system of claim 12, wherein the UE is configured to:
    determine if a same Universal Integrated Circuit Card (UICC) is used during the power-off and power-on condition;
    perform PLMN selection if different UICC is used; and
    continue in manual CSG selection mode along with corresponding stored parameters of CSG information if same UICC is used.

* * * * *